United States Patent
Wei

(10) Patent No.: US 11,604,394 B2
(45) Date of Patent: Mar. 14, 2023

(54) ANTI-DAZZLING APPARATUS AND CONTROL METHOD THEREOF AND VEHICLE

(71) Applicant: BOE TECHNOLOGY GROUP CO., LTD., Beijing (CN)

(72) Inventor: Wei Wei, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 350 days.

(21) Appl. No.: 16/652,566

(22) PCT Filed: Mar. 26, 2019

(86) PCT No.: PCT/CN2019/079723
§ 371 (c)(1),
(2) Date: Mar. 31, 2020

(87) PCT Pub. No.: WO2019/184917
PCT Pub. Date: Oct. 3, 2019

(65) Prior Publication Data
US 2020/0241378 A1 Jul. 30, 2020

(30) Foreign Application Priority Data
Mar. 27, 2018 (CN) .......................... 201810261786.0

(51) Int. Cl.
*G02F 1/163* (2006.01)
*B60J 3/04* (2006.01)
(Continued)

(52) U.S. Cl.
CPC ............... *G02F 1/163* (2013.01); *B60J 3/04* (2013.01); *G02F 1/133502* (2013.01); *G02F 1/155* (2013.01); *G02F 1/157* (2013.01)

(58) Field of Classification Search
None
See application file for complete search history.

(56) References Cited

U.S. PATENT DOCUMENTS

| 4,678,296 A | * | 7/1987 | Smith | ...................... G02C 7/16 351/45 |
| 2016/0159206 A1 | * | 6/2016 | Nakashima | ............ G02B 26/02 250/201.1 |

(Continued)

FOREIGN PATENT DOCUMENTS

| CN | 105667260 A | 6/2016 |
| CN | 105904947 A | 8/2016 |

(Continued)

OTHER PUBLICATIONS

The First Chinese Office Action dated Jun. 12, 2019; Appln. No. 201810261786.0.

*Primary Examiner* — Ryan Crockett

(57) ABSTRACT

An anti-dazzling apparatus and a control method thereof arid a vehicle are provided. The anti-dazzling apparatus includes a light regulation member and an acquisition module. The light regulation member is arranged on a light path between an external light source of a vehicle and a human eye and configured to regulate an intensity of light of the external light source, which is incident to the human eye, according to information of the human eye and information of the external light source, and the acquisition module is configured to acquire the information of the human eye and the information of the external light source.

19 Claims, 7 Drawing Sheets

(51) Int. Cl.
*G02F 1/1335* (2006.01)
*G02F 1/155* (2006.01)
*G02F 1/157* (2006.01)

(56) References Cited

U.S. PATENT DOCUMENTS

2018/0304727 A1* 10/2018 Choi .......................... B60J 3/04
2020/0039334 A1* 2/2020 Wu ............................ B60J 1/02

FOREIGN PATENT DOCUMENTS

| | | | |
|---|---|---|---|
| CN | 106143072 A | | 11/2016 |
| CN | 106994884 A | | 8/2017 |
| CN | 107310480 A | | 11/2017 |
| CN | 107776371 A | * | 3/2018 |
| CN | 107791800 A | | 3/2018 |
| CN | 108312968 A | | 7/2018 |
| DE | 102012108555 B3 | | 2/2014 |
| SU | 1685761 A1 | | 10/1991 |
| WO | 2016/093720 | | 6/2016 |

* cited by examiner

ANTI-DAZZLING APPARATUS AND CONTROL METHOD THEREOF AND VEHICLE

This application claims priority to Chinese Patent Application No. 201810261786.0 filed Mar. 27, 2018, the disclosure of which is incorporated herein by reference as part of the application.

TECHNICAL FIELD

At least one embodiment of the present disclosure relates to an anti-dazzling apparatus and a control method thereof, and a vehicle.

BACKGROUND

When a vehicle runs at night, a high beam is usually used to view the condition of the road ahead. When two vehicles meet, a high beam of an oncoming vehicle will generate serious stimulation to a driver's eyes, resulting in that the driver is instantly dazzled. According to different visions and surroundings of drivers, dazzling durations are also different, but the dazzling duration will last at least about 2 seconds. In the about 2 seconds, it is just like that the driver drives with eyes closed, and the ability to observe the surrounding is significantly reduced, which is unbeneficial to safety driving of the driver. In addition, when a vehicle runs at night, light of a high beam of another vehicle behind may be irradiated to rearview mirrors inside and outside the vehicle; when strong light is reflected to the driver's eyes, it also may cause the driver to be instantly dazzled and influence the driver's sight; especially when the vehicle runs at a high speed, a brake distance may be greatly increased, which seriously influence safety of driving at night.

Therefore, how to eliminate influence of the high beam on the driver to improve safety of driving at night has become a technical problem urgent to be solved.

SUMMARY

At least one embodiment of the present disclosure provides an anti-dazzling apparatus, the anti-dazzling apparatus comprises a light regulation member and an acquisition module. The light regulation member is arranged on a light path between an external light source of a vehicle and a human eye and configured to regulate an intensity of light of the external light source, which is incident to the human eye, according to information of the human eye and information of the external light source, and the acquisition module is configured to acquire the information of the human eye and the information of the external light source.

For example, in the anti-dazzling apparatus provided by at least one embodiment of the present disclosure, the information of the human eye includes a position of a human eye pupil, and the information of the external light source includes a central position and an area of the external light source.

For example, the anti-dazzling apparatus provided by at least one embodiment of the present disclosure further comprises a processing module and a control module, the processing module is configured to determine a dazzling region on the light regulation member according to the information of the human eye pupil and the information of the external light source, and the control module, configured to control the light regulation member according to the dazzling region so as to control the intensity of the light incident to the human eye via the dazzling region.

For example, in the anti-dazzling apparatus provided by at least one embodiment of the present disclosure, the light regulation member includes a plurality of light regulation subunits, and each of the plurality of light regulation subunits is set to switch between a transparent state and a dark state.

For example, in the anti-dazzling apparatus provided by at least one embodiment of the present disclosure, each of the plurality of light regulation subunits includes a liquid crystal layer and polarizers and liquid crystal control electrodes which are positioned on both opposite sides of the liquid crystal layer.

For example, in the anti-dazzling apparatus provided by at least one embodiment of the present disclosure, the light regulation member includes a chromotropic film.

For example, in the anti-dazzling apparatus provided by at least one embodiment of the present disclosure, the chromotropic film is an electrochromic film, and the control module configured to control a voltage of the chromotropic film according to the dazzling region.

For example, in the anti-dazzling apparatus provided by at least one embodiment of the present disclosure, the electrochromic film includes a first electrode layer, a second electrode layer and an electrochromic material layer positioned between the first electrode layer and the second electrode layer.

For example, in the anti-dazzling apparatus provided by at least one embodiment of the present disclosure, the first electrode layer and/or the second electrode layer are set to include a plurality of sub-electrodes arranged in an array; or the first electrode layer includes a plurality of longitudinal electrodes parallel with each other, the second electrode layer includes a plurality of transverse electrodes parallel with each other, and the transverse electrodes and the longitudinal electrodes intersect.

For example, in the anti-dazzling apparatus provided by at least one embodiment of the present disclosure, the light regulation member includes a first light regulation member, and the first light regulation member is arranged on a front windscreen; the processing module includes a first processing unit, and the first processing unit is configured to determine a first dazzling region on the front windscreen according to the information of the human eye and information of a light source of a vehicle ahead; and the control module includes a first control unit, and the first control unit is configured to control the first light regulation member according to the first dazzling region so as to reduce light transmittance of the first dazzling region.

For example, in the anti-dazzling apparatus provided by at least one embodiment of the present disclosure, the front windscreen includes a first glass layer and a second glass layer, and the first light regulation member is positioned between the first glass layer and the second glass layer.

For example, in the anti-dazzling apparatus provided by at least one embodiment of the present disclosure, the light regulation member includes a second light regulation member, and the second light regulation member is arranged on a rearview mirror; the processing module further includes a second processing unit, and the second processing unit is configured to determine a second dazzling region on the rearview mirror according to the information of the human eye and information of a light source of a vehicle behind; and the control module further includes a second control unit, and the second control unit is configured to control the second light regulation member according to the second dazzling region so as to reduce light reflectivity of the second dazzling region.

For example, in the anti-dazzling apparatus provided by at least one embodiment of the present disclosure, the light regulation member further includes a third light regulation member, and the third light regulation member is arranged on a rear windscreen; the processing module further includes a third processing unit, and the third processing unit is configured to determine a third dazzling region on the rear windscreen according to the information of the human eye and a information of a light source of a vehicle behind; and the control module further includes a third control unit, and the third control unit is configured to control the third light regulation member according to the third dazzling region so as to reduce light transmittance of the third dazzling region.

For example, in the anti-dazzling apparatus provided by at least one embodiment of the present disclosure, the acquisition module includes at least one of a human eye tracking device, a vehicle detector, a first image acquisition member and/or a second image acquisition member.

For example, in the anti-dazzling apparatus provided by at least one embodiment of the present disclosure, the human eye tracking device is configured to acquire a information of a human eye pupil; the vehicle detector is configured to acquire position coordinates of a vehicle ahead and/or position coordinates of a vehicle behind; the first image acquisition member is configured to acquire an image of the vehicle ahead; and the second image acquisition member is configured to acquire an image of the vehicle behind.

For example, in the anti-dazzling apparatus provided by at least one embodiment of the present disclosure further comprises a third control unit, a first ambient light sense module for detecting brightness of ambient light ahead and/or a second ambient light sense module for detecting brightness of ambient light behind, when the brightness of the ambient light ahead and/or the brightness of the ambient light behind is greater than a first preset threshold value, the third control unit is configured to start the acquisition module.

For example, in the anti-dazzling apparatus provided by at least one embodiment of the present disclosure further comprises a third ambient light sense module configured to detect brightness of ambient light, when the brightness of the ambient light is smaller than or equal to a second preset threshold value, the third control unit is further configured to start the first ambient light sense module and the second ambient light sense module.

At least one embodiment of the present disclosure provides a vehicle, the vehicle comprises the anti-dazzling apparatus according to any one of embodiments.

At least one embodiment of the present disclosure provides a control method of the anti-dazzling apparatus according to any one of embodiments, the control method comprises: acquiring information of a human eye pupil and information of an external light source by an acquisition module; and controlling the light regulation member according to the information of the human eye pupil and the information of the external light source so as to control the intensity of the light incident to a human eye.

For example, in the control method of the anti-dazzling apparatus provided by at least one embodiment of the present disclosure, the anti-dazzling apparatus further includes a processing module and a control module, the method further comprises: processing the information of the human eye. pupil and the information of the external light source by utilizing the processing module so as to determine a dazzling region on the light regulation member; and controlling the light regulation member according to the dazzling region by utilizing the control module so as to reduce the intensity of the light incident to the human eye via the, dazzling region.

For example, in the control method of the anti-dazzling apparatus provided by at least one embodiment of the present disclosure, the controlling the light regulation member according to the dazzling region includes: controlling a voltage of the light regulation member according to the dazzling region.

For example, in the control method of the anti-dazzling apparatus provided by at least one embodiment of the present disclosure, the determining the dazzling region according to the information of the human eye pupil and the information of the external light source includes: determining a first dazzling region on a front windscreen according to the information of the human eye and information of a light source of a vehicle ahead; and controlling the light regulation member according to the dazzling region so as to reduce an intensity of light incident to the human eye via the dazzling region.

For example, in the control method of the anti-dazzling apparatus provided by at least one embodiment of the present disclosure, before the determining the first dazzling region on the front windscreen, the control method further comprises: detecting brightness of ambient light ahead, and when the brightness of the ambient light ahead is greater than a first preset threshold value, starting the acquisition module.

For example, in the control method of the anti-dazzling apparatus provided by at least one embodiment of the present disclosure, determining the dazzling region according to the information of the human eye pupil and the information of the external light source includes: determining a second dazzling region on a rearview mirror according to the information of the human eye and information of a light source of a vehicle behind; and controlling the light regulation member according to the second dazzling region so as to reduce an intensity of light incident to the human eye via the second dazzling region.

For example, in the control method of the anti-dazzling apparatus provided by at least one embodiment of the present disclosure, before the determining the first dazzling region on the rearview mirror, the control method further comprises: detecting brightness of ambient light behind, and when the brightness of the ambient light behind is greater than the first preset threshold value, starting the acquisition module.

For example, in the control method of the anti-dazzling apparatus provided by at least one embodiment of the present disclosure, determining the dazzling region according to the information of the human eye pupil and the information of the external light source includes: determining a third dazzling region on a rear windscreen according to the information of the human eye and information of a light source of a vehicle behind; and controlling the light regulation member according to the third dazzling region so as to reduce an intensity of light incident to the human eye via the third dazzling region.

For example, in the control method of the anti-dazzling apparatus provided by at least one embodiment of the present disclosure, determining the dazzling region on the light regulation member includes: determining a position of the human eye pupil so as to determine a sight of the human eye pupil; determining a central position and an area of the external light source so as to determine an irradiation direction of the light emitted by the external light source; and determining the dazzling region on the light regulation member according to the sight of the human eye pupil and the irradiation direction of the light emitted by the external light source, and the dazzling region is a region of the light regulation member, which is positioned on a path from the light emitted by the light source to the human eye pupil.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Unless otherwise defined, all the technical and scientific terms used herein have the same meanings as commonly understood by one of ordinary skill in the art to which the present disclosure belongs. The terms, such as "first," "second," or the like, which are used in the description and the claims of the present disclosure, are not intended to indicate any sequence, amount or importance, but for distinguishing various components. The terms, such as "comprise/comprising," "include/including," or the like are intended to specify that the elements or the objects stated before these terms encompass the elements or the objects and equivalents thereof listed after these terms, but not preclude other elements or objects. The terms, such as "connect/connecting/connected," "couple/coupling/coupled" or the like, are not limited to a physical connection or mechanical connection, but may include an electrical connection/coupling, directly or indirectly. The terms, "on," "under," "left," "right," or the like are only used to indicate relative position relationship, and when the position of the object which is described is changed, the relative position relationship may be changed accordingly.

Figure 1A:
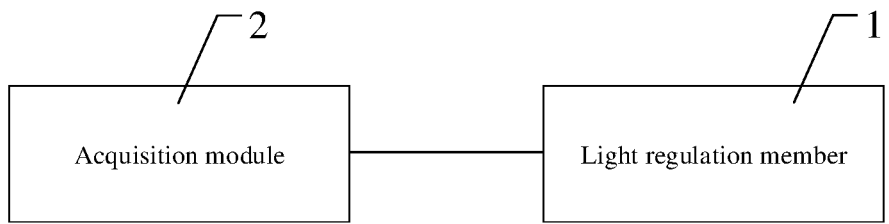
FIG. 1A is a schematic diagram of an anti-dazzling apparatus provided by some embodiments of the present disclosure.

FIG. 1A is a schematic diagram of an anti-dazzling apparatus provided by some embodiments of the present disclosure. For example, as shown in FIG. 1A, the anti-dazzling apparatus provided by at least one embodiment of the present disclosure may be arranged on a vehicle. For example, the anti-dazzling apparatus includes a light regulation member 1 and an acquisition module 2. The light regulation member 1 is arranged on a light path between a vehicle external light source (for example, a high beam) and a human eye, and is configured to regulate an intensity of light from the external light source, which is incident to the human eye, according to information of the human eye and information of the external light source, and the acquisition module 2 is used for acquiring the information of the human eye (for example, a human eye pupil) and the information of the external light source.

For example, in at least one embodiment of the present disclosure, the light regulation member is configured to regulate the intensity of the light from the external light source, which is incident to the human eye, according to the information of the human eye pupil and the information of the external light source. For example, the information of the human eye includes a position of the human eye pupil, and the information of the external light source includes a central position and an area of the external light source.

In the anti-dazzling apparatus provided by at least one embodiment of the present disclosure, by determining a dazzling region on a chromotropic film and controlling light transmittance of the chromotropic film according to the dazzling region, the aim of controlling (for example, reducing) the intensity of the light incident to the human eye via the dazzling region is fulfilled, which avoids influence of an external high beam of the vehicle on a driver, prevents the driver from being dazzled, and improves safety of driving at night.

It should be noted that in at least one embodiment of the present disclosure, a structure of the light regulation member is not limited, as long as the light regulation member can change light transmittance of the light regulation member.

For example, in some embodiments of the present disclosure, the light regulation member may be set to include a plurality of light regulation subunits, and each of the light regulation subunits is set to switch between a transparent state and a dark state. Therefore, by controlling the light regulation subunit corresponding to the dazzling region to switch to the dark state, the light transmittance of the dazzling region is reduced or no light transmits the dazzling region so as to fulfill the aim of controlling (for example, reducing) the intensity of the light incident to the human eye via the dazzling region. For example, the light transmittance in the dark state is lower than that in the transparent state, and for example, the light transmittance in the dark state may be set to be close to zero or enable the intensity of the transmitting light not to cause the driver to generate a dazzled feeling.

For example, in some other embodiments of the present disclosure, the light regulation member includes a chromotropic film. By controlling a color depth of the chromotropic film or switching of the chromotropic film among different colors, light transmittance of a portion of the chromotropic film, which corresponds to the dazzling region, is reduced, so as to fulfill the aim of controlling (for example, reducing) the intensity of the light incident to the human eye via the dazzling region.

The technical solution in at least one under-mentioned embodiment of the present disclosure will be illustrated below by taking a case that the light regulation member is the chromotropic film as an example.

Figure 1B:
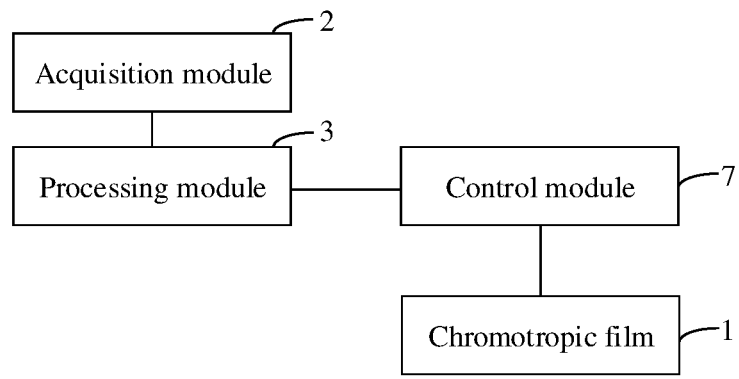
FIG. 1B is a schematic diagram of an anti-dazzling apparatus provided by some embodiments of the present disclosure.

For example, as shown in FIG. 1B, an anti-dazzling apparatus provided by at least one embodiment of the present disclosure further includes a processing module 3 and a control module 7. The processing module 3 is used for determining the dazzling region on the light regulation member (the chromotropic film 1) according to the information of the human eye pupil and information of an external high beam, and the control module 7 is used for controlling the light regulation member according to the dazzling region so as to control the intensity of the light incident to the human eye via the dazzling region.

For example, in at least one embodiment of the present disclosure, the chromotropic film 1 may be an electrochromic film, and the control module 7 is used for controlling a voltage of the chromotropic film according to the dazzling region. The electrochromic film includes an electrochromic material, and after the electrochromic material is applied with a voltage, the color of the electrochromic material may be changed, so that light transmittance of the electrochromic material is changed. Therefore, the control module 7 may control the intensity of the light incident to the human eye via the dazzling region by controlling the light transmittance of the dazzling region of the chromotropic film 1.

For example, in at least one embodiment of the present disclosure, "color change" may be a switching among different colors, and also may be switching of one color among different color depths or intensities.

An anti-dazzling apparatus and a control method thereof and a vehicle, as provided by at least one embodiment of the present disclosure, will be illustrated below in connection of the drawings, and the technical contents of the present disclosure will be introduced in detail by taking a case that the chromotropic film is the electrochromic film as an example through specific embodiments.

In at least one embodiment of the present disclosure, an arrangement position of a light regulation member of the anti-dazzling apparatus is not limited, as long as the light regulation member is positioned in a sight range of a human eye. For example, the light regulation member may be positioned on a front windscreen, a rear windscreen, a rearview mirror or other positions of a vehicle, and in embodiments below, a working principle of the anti-dazzling apparatus will be illustrated according to different arrangement positions of the light regulation member.

Figure 2:
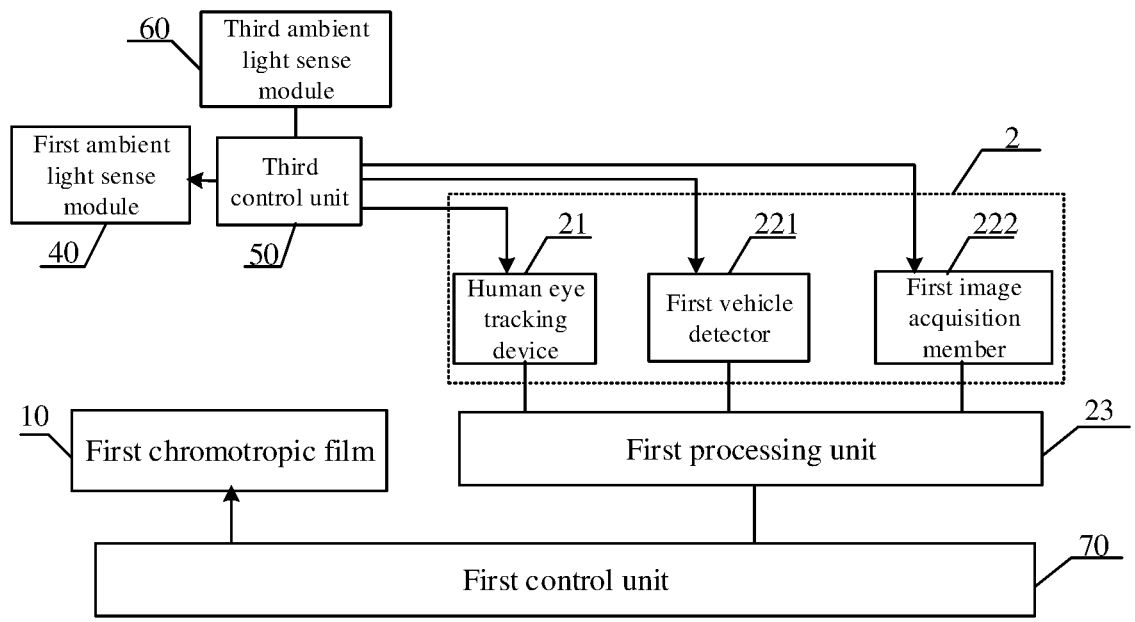
FIG. 2 is a structural schematic diagram of an anti-dazzling apparatus provided by some embodiments of the present disclosure.

FIG. 2 is a structural schematic diagram of an anti-dazzling apparatus provided by some embodiments of the present disclosure. For example, in at least one embodiment of the present disclosure, as shown in FIG. 2, the anti-dazzling apparatus may be used for preventing the driver from being dazzled due to a high beam of a vehicle ahead. In the anti-dazzling apparatus, the chromotropic film 1 includes a first chromotropic: film 10, the processing module 3 includes a first processing unit 23, the control module 7 includes a first control unit 70, and the first control unit 70 is respectively connected with the first chromotropic film 10 and the first processing unit 23. For example, the first chromotropic film 10 may be arranged on the front windscreen of the vehicle; the first processing unit 20 may be used for determining a first dazzling region on the front windscreen (the first chromotropic film 10 thereon) according to the information of the human eye pupil and information of the high beam of the vehicle ahead; and the first control unit 70 is electrically connected with the first chromotropic film 10 and the first processing unit 23, respectively, and the first control unit 70 is used for controlling the first chromotropic film 10 according to the first dazzling region so as to reduce light transmittance of a portion of the first chromotropic film 10, which is positioned in the first dazzling region.

For the current vehicle, light of the high beam ahead, which transmits the first dazzling region, may be directly incident to the human eye pupil, resulting in that the driver is dazzled. In the anti-dazzling apparatus of at least one embodiment of the present disclosure, by determining the first dazzling region on the front windscreen of the vehicle and controlling the first chromotropic film according to the first dazzling region, light transmittance of the first dazzling region is reduced so as to reduce the intensity of the light incident to the human eye pupil through the first dazzling region, prevent the driver from being dazzled, avoid influence of the high beam of the vehicle ahead on the driver and improve safety of driving at night.

For example, in at least one embodiment of the present disclosure, the control unit may be a central processing unit, a digital signal processor, a single chip microcomputer, a programmable logic controller and the like. For example, the control unit may further include a storage, also may include a power supply module and the like, and achieves power supply and signal input output functions by a wire, a signal line and the like which are additionally arranged. For example, the control unit also may include a hardware circuit, a computer executable code and the like. The hardware circuit may include a conventional Very Large Scale Integration (VLSI) circuit or a gate array and an existing semiconductor, such as a logic chip and a transistor, or an other discrete component; and the hardware circuit also may include a field programmable gate array, a programmable array logic, a programmable logic device and the like.

Figure 3A:
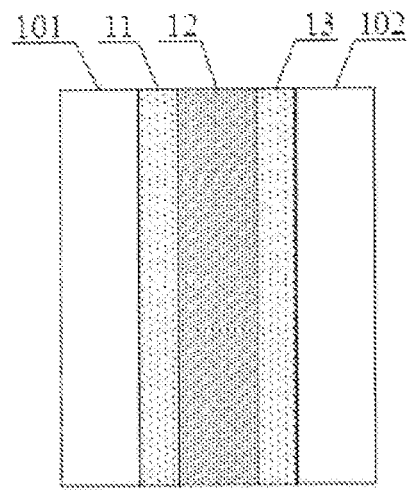
FIG. 3A is a structural schematic diagram of a profile of a front windscreen in an anti-dazzling apparatus provided by some embodiments of the present disclosure.

FIG. 3A is a structural schematic diagram of a profile of a front windscreen in an anti-dazzling apparatus provided by some embodiments of the present disclosure. For example, in at least one embodiment of the present disclosure, as shown in FIG. 3A, the first chromotropic film 10 includes a first electrode layer 11, a second electrode layer 13 and an electrochromic material layer 12 sandwiched between the first electrode layer 11 and the second electrode layer 13. The front windscreen includes a first glass layer 101, a second glass layer 102 and the first chromotropic film 10, wherein the first chromotropic film 10 is sandwiched between the first glass layer 101 and the second glass layer 102. When voltages are respectively applied to the first electrode layer 11 and the second electrode layer 13, a color of the electrochromic material layer 12 can be changed according to a voltage difference between the first electrode layer 11 and the second electrode layer 13, so as to change light transmittance of the electrochromic material layer. For example, the greater the voltage difference between the first electrode layer and the second electrode layer is, the lower the light transmittance of the first chromotropic film is.

For example, in at least one embodiment of the present disclosure, an electrochromic material may include an inorganic electrochromic material such as titanium dioxide, tungsten trioxide and the like, also may include an organic electrochromic material such as viologens and the like, and any specific limit is not made to the electrochromic material herein.

For example, both the first electrode layer and the second electrode layer are transparent electrode layers. For example, materials for producing the first electrode layer and the second electrode layer may include Indium Tin Oxide (ITO), Indium Zinc Oxide (IZO), Indium Gallium Oxide (IGO), Gallium Zinc Oxide (GZO), Zinc Oxide (ZnO), Indium Oxide ($In_2O_3$), Aluminum Zinc Oxide (AZO), carbon nanotubes or other transparent conductive materials. For example, in at least one embodiment of the present disclosure, "transparent" may represent that transmittance of the light is 50% to 100% and for example, further is 75% to 100%.

It should be noted that in at least one embodiment of the present disclosure, a structure of an electrochromic film (for example, a second chromotropic film in the under-mentioned embodiments) may refer to the structure of the first electrochromic film, and is not repeated herein.

For example, in some embodiments of the present disclosure, as shown in FIG. 3A, the first electrochromic film is sandwiched between the first glass layer 101 and the second glass layer 102. For example, in some other embodiments of the present disclosure, the first electrochromic film also may be arranged on a side of the first glass layer, which faces away from the second glass layer. For example, in some other embodiments of the present disclosure, the first electrochromic film also may be arranged on a side of the second glass layer, which faces away from the first glass layer. In the embodiments of the present disclosure, a position of the first electrochromic film on the front windscreen may be set as required.

Figure 3B:
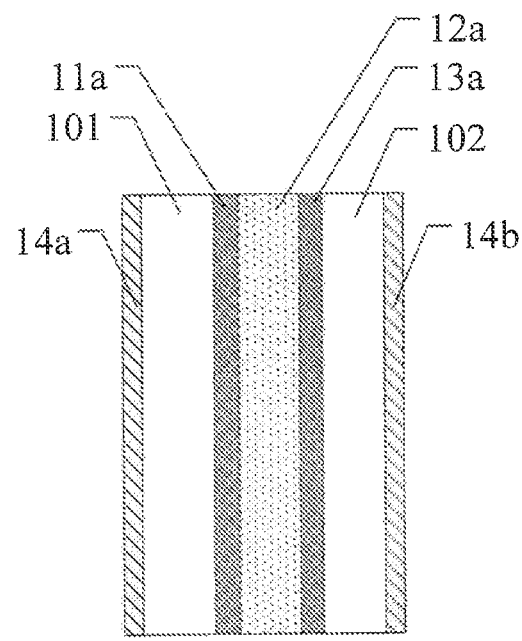
FIG. 3B is a structural schematic diagram of a profile of a front windscreen in another anti-dazzling apparatus provided by some embodiments of the present disclosure.

For example, in some other embodiments of the present disclosure, the light regulation member includes a plurality of light regulation subunits, and the light regulation subunit includes a liquid crystal layer and polarizers and liquid crystal control electrodes which are positioned on both opposite sides of the liquid crystal layer. Exemplarily, as shown in FIG. 3B, the liquid crystal layer 12a is arranged between the first glass layer 101 and the second glass layer 102, the liquid crystal control electrodes includes a first electrode 11a and a second electrode 13a positioned on both the opposite sides of the liquid crystal layer 12a, and a first polarizer 14a and a second polarizer 14b are respectively arranged on both the opposite sides of the liquid crystal layer 12a. The first polarizer 14a and the second polarizer 14b are configured to change transmitting light into linearly polarized light. The light generated by the high beam is changed into the linearly polarized light after passing through the first polarizer 14a, an electric field may be generated after voltages are applied to the first electrode 11a and the second electrode 13a, and a torsion degree of liquid crystal molecules in the liquid crystal layer 12a may be controlled by controlling an intensity of the electric field so as to control whether the linearly polarized light transmitting the liquid crystal layer 12a can pass through the second polarizer 14b, and control a transmitting degree of the light. For example, after the linearly polarized light passes through the liquid crystal layer 12a, a polarization direction is in parallel with an absorption axis of the second polarizer 14b, so that the light generated by the high beam cannot pass through the light regulation member. For example, the first polarizer 14a and the second polarizer 14b are the same in polarization direction, so that the light regulation member is kept transparent in a normal state.

In the embodiments of the present disclosure, a mode of acquiring the information of the human eye pupil and the information of the vehicle ahead is not limited. For example, in at least one embodiment of the present disclosure, as shown in FIG. 2, the acquisition module 2 includes a human eye tracking device 21, a first vehicle detector 221 and a first image acquisition member 222. The human eye tracking device 21 is used for acquiring the information of the human eye pupil. The first vehicle detector 221 is used for acquiring position coordinates of the vehicle ahead with respect to the first vehicle detector 221, the first image acquisition member 222 is used for acquiring an image of the vehicle ahead, and the information of the high beam of the vehicle ahead may be determined according to the image of the vehicle ahead and the position coordinates of the vehicle ahead. For example, the first processing unit 23 carries out analysis processing on the information of the human eye pupil and the information of the high beam of the vehicle ahead so as to determine information of the first dazzling region on the front windscreen. For example, the information of the human eye pupil includes position coordinates of the human eye pupil and a sight direction of the human eye pupil. The information of the high beam of the vehicle ahead includes position coordinates of the high beam of the vehicle ahead. The information of the first dazzling region includes position coordinates of the first dazzling region. In at least one embodiment of the present disclosure, the first control unit 70 controls the first chromotropic film 10 according to the first dazzling region, and for example, the first control unit 70 applies a corresponding voltage to a portion of the first chromotropic film, which is positioned in the first dazzling region, according to the position coordinates of the first dazzling region.

For example, the information of the human eye pupil is acquired by adopting the human eye tracking device, and in some embodiments of the present disclosure, the human eye tracking device may be a depth camera. in some other embodiments of the present disclosure, the human eye tracking device may be a device capable of acquiring the information of the human eye pupil, such as an infrared device and the like. For example, the position coordinates of the human eye pupil, which are acquired by the human eye tracking device, are position coordinates of the human eye pupil with respect to the human eye tracking device. For example, the human eye tracking device may be arranged in the vehicle so as to implement real-time tracking on the human eye pupil.

For example, in at least one embodiment of the present disclosure, as shown in FIG. 2, the position coordinates of the high beam of the vehicle ahead, which are acquired by the first vehicle detector 221 and the first image acquisition member 222, are position coordinates of the high beam of the vehicle ahead with respect to the first vehicle detector 221. For example, the first vehicle detector may be a detector capable of detecting a position of the vehicle ahead, such as a radar detector, an ultrasonic detector and the like, and in at least one embodiment of the present disclosure, any specific limit is not made to the first vehicle detector. For example, the first image acquisition member may be a device capable of imaging, such as a camera and the like, and specifically may be selected according to actual demands. For example, the first vehicle detector may be arranged at the top of the outside of the vehicle, and the first image acquisition member may be arranged at a position at the front portion of the vehicle, which is close to the first vehicle detector. Specific setting positions of the first vehicle detector and the first image acquisition member are not limited herein, and the first vehicle detector and the first image acquisition member may be set at proper positions on the vehicle according to actual demands.

For example, in at least one embodiment of the present disclosure, the first processing unit 23 may be used for carrying out analysis processing on the information of the human eye pupil and the information of the high beam of the vehicle ahead so as to determine the position coordinates of the first dazzling region on the front windscreen. For example, a working principle of the first processing unit 23 is specifically and roughly as follows: a certain determined position on the vehicle is used as a coordinate origin; and a position of the front windscreen with respect to the vehicle is determined and then position coordinates of the front windscreen are also determined, and thus, the position coordinates of the front windscreen may be pre-stored in the first processing unit 23. Position coordinates of the human eye tracking device with respect to the coordinate origin are also determined, and similarly, position coordinates of the first vehicle detector with respect to the coordinate origin are also determined. The first processing unit 23 carries out analysis processing on the position coordinates of the human eye tracking device with respect to the coordinate origin and the position coordinates of the human eye pupil so as to acquire position coordinates of the human eye pupil with respect to the coordinate origin. The first processing unit 23 carries out analysis processing on the position coordinates of the first vehicle detector with respect to the coordinate origin, the position coordinates of the vehicle ahead and the image of the vehicle ahead so as to acquire position coordinates of the high beam of the vehicle ahead with respect to the coordinate origin. Therefore, the position coordinates of the human eye pupil, the high beam of the vehicle ahead and the front windscreen in the same coordinate system may be respectively determined. The human eye pupil includes a left eye pupil and a right eye pupil, and the high beam of the vehicle ahead include a left high beam and a right high beam of the vehicle ahead.

Figure 4:
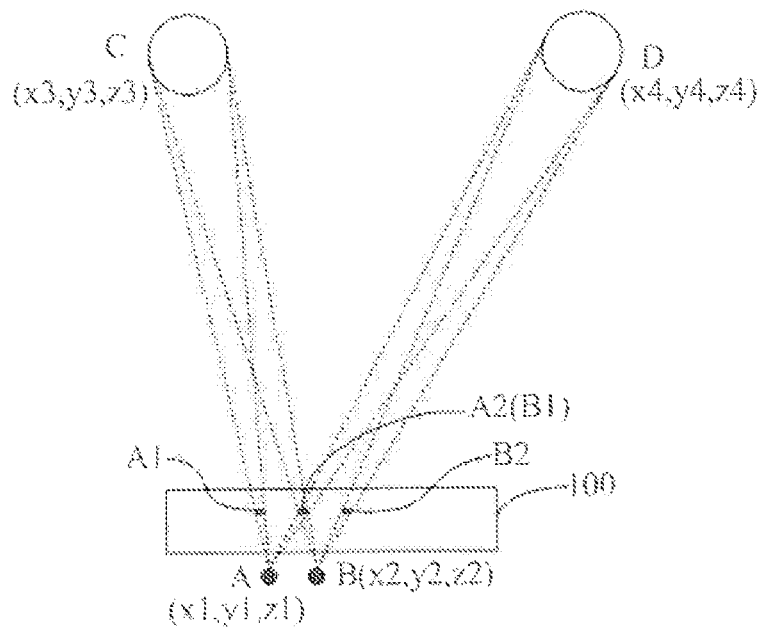
FIG. 4 is a schematic diagram of a principle of acquiring a first dazzling region, as provided by some embodiments of the present disclosure.

FIG. 4 is a schematic diagram of a principle of acquiring the first dazzling region, as provided by some embodiments of the present disclosure. In FIG. 4, information of the left eye pupil, the right eye pupil of the driver and the left high beam and the right high beam of the vehicle ahead in the same coordinate system are respectively shown, wherein position coordinates of the left eye pupil A are $(x1, y1, z1)$, position coordinates of the right eye pupil B are $(x2, y2, z2)$, position coordinates of the left high beam C are $(x3, y3, z3)$, and position coordinates of the right high beam D are $(x4, y4, z4)$. For example, when the sight of the human eye intersects with an irradiation direction of the high beam, the human eye may be dazzled. FIG. 4 shows a schematic diagram in which an irradiation direction of the left high beam C intersects with the sight of the human eye, and simultaneously also shows a schematic diagram in which an irradiation direction of the right high beam D intersects with the sight of the human eye. At the moment, light paths respectively between the left high beam C and the right high beam D and the left eye pupil A and the right eye pupil B respectively form intersection regions A1, A2, B1 and B2 with the front windscreen 100. Then, light emitted by the high beam, which passes through the intersection regions, may be directly irradiated to the human eye pupil to make a person dazzled. For example, light emitted by the left high beam C, which passes through the intersection region A1, may be directly irradiated to the left eye pupil A to make a left eye dazzled, and similarly; light emitted by the left high beam C, which passes through the intersection region B1, may be directly irradiated to the right eye pupil B to make a right eye dazzled. Therefore, the intersection regions A1, A2, B1 and B2 are the first dazzling regions. The position coordinates of the left high beam C, the right high beam D, the left eye pupil A, the right eye pupil B and the front windscreen 100 are all determined, and thus, the first processing unit 23 may acquire position coordinates of the intersection regions A1, A2, B1 and B2, i.e., the first dazzling regions, according to the position coordinates of the left eye pupil, the right eye pupil and the left high beam and the right high beam of the vehicle ahead and the position coordinates of the front windscreen. For example, the acquired information of the high beam may include a central position and an area of the light emitted by the high beam so as to determine the irradiation direction of the light emitted by the high beam, an irradiation area of the light on the light regulation member (for example, the front windscreen 100) and the like, thereby determining the intersection regions A1, A2, B1 and B2.

Figure 5:
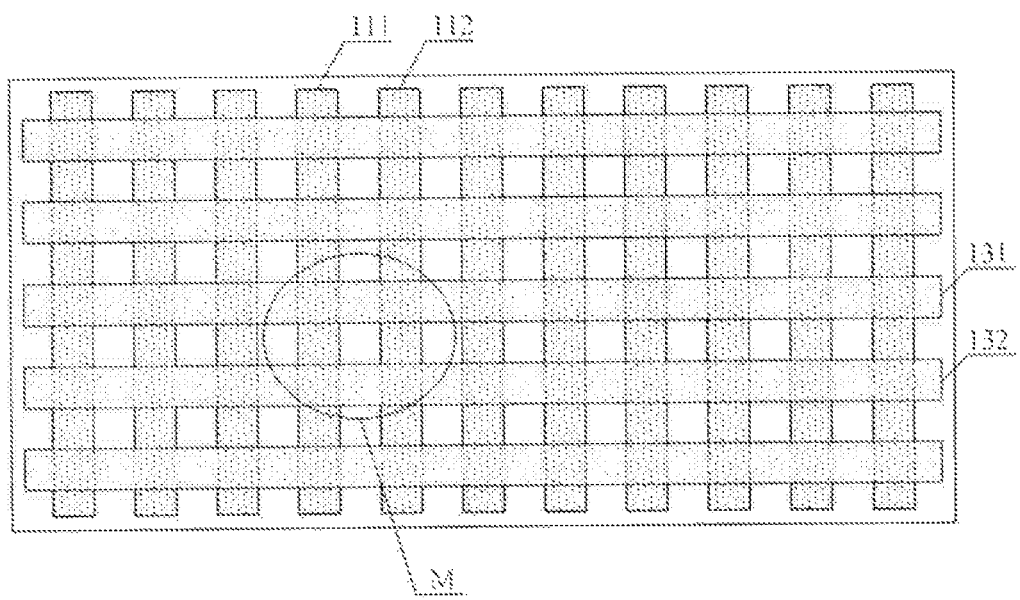
FIG. 5 is a main-view structural schematic diagram of the front windscreen in FIG. 3.

FIG. 5 is a main-view structural schematic diagram of the front windscreen in FIG. 3A. With reference to FIG. 5, FIG. 5 shows a first dazzling region M. The first control unit 70 applies the corresponding voltage to the corresponding first chromotropic film according to position coordinates of the first dazzling region, and specifically, the first electrode layer 11 includes a plurality of longitudinal electrodes arranged in parallel, and the second electrode layer 12 includes a plurality of transverse electrodes arranged in parallel. The longitudinal electrodes 111 and 112 and the transverse electrodes 131 and 132 which correspond to the first dazzling region M are obtained according to the position coordinates of the first dazzling region M. Application of the corresponding voltages to the first electrode layer 11 and the second electrode layer 13 means that respective application of the voltages to the longitudinal electrodes 111 and 112 and the transverse electrodes 131 and 132, and the change of a voltage difference between the longitudinal electrodes 111 and 112 and the transverse electrodes 131 and 132 also means the change of a voltage difference corresponding to the first dazzling region M, so that the color of the electrochromic material at the position of the first dazzling region M is changed and for example, the color at the position of the first dazzling region M is changed into black (for example, the color is changed into black from white or darkened into black from gray) to reduce light transmittance of the first dazzling region M, thereby reducing the intensity of the light incident to the human eye pupil through the first dazzling region M.

For example, in at least one embodiment of the present disclosure, at least one of the first electrode layer and the second electrode layer may be set to include a plurality of sub-electrodes arranged in an array. For example, one of the first electrode layer and the second electrode layer is set to include a plurality of sub-electrodes arranged in an array, and the other one of the first electrode layer and the second electrode layer is set as a planar electrode (a common electrode). For example, both the first electrode layer and the second electrode layer are set to include a plurality of sub-electrodes arranged in an array, and the sub-electrodes in the first electrode layer are in a one-to-one correspondence with the sub-electrodes in the second electrode layer.

For example, in at least one embodiment of the present disclosure, as shown in FIG. 2, the anti-dazzling apparatus may further include a first ambient light sense module 40 and a third control unit 50, and the first ambient light sense module 40 is used for detecting brightness of ambient light ahead. When the first ambient light sense module 40 detects that the brightness of the ambient light ahead is greater than a first preset threshold value, the third control unit 50 is used for starting the acquisition module 2.

In at least one embodiment of the present disclosure, the first ambient light sense module 40 is used for detecting whether the high beam of the vehicle ahead is turned on, and if the first ambient light sense module 40 detects that the brightness of the ambient light ahead is greater than the first preset threshold value, it shows that the high beam of the vehicle ahead is turned on, and then the third control unit 50 starts the acquisition module 2 so as to timely reduce the light transmittance of the first dazzling region on the front windscreen and reduce the intensity of the light directly incident to the human eye pupil, thereby preventing the driver from being dazzled. When the first ambient light sense module 40 detects that the brightness of the ambient light ahead is not greater than the first preset threshold value, it shows that the vehicle is in a street lamp environment or only a low beam of the vehicle ahead is turned on, and at the moment, the acquisition module 2 does not need to be started. The first preset threshold value may be set according to brightness of light when people can be dazzled, and is not limited herein. For example, the first preset threshold value may be 0.5 lumen to 1.5 lumens.

For example, in at least one embodiment of the present disclosure, as shown in FIG. 2, the anti-dazzling apparatus may further include a third ambient light sense module 60, and the third ambient light sense module 60 may be used for detecting brightness of ambient light. For example, when the third ambient light sense module 60 detects that the brightness of the ambient light is smaller than or equal to a second preset threshold value, the third control unit 50 is further used for starting the first ambient light sense module 40.

In at least one embodiment of the present disclosure, the third ambient light sense module 60 may be used for detecting brightness of an external environment of the vehicle, and when the third ambient light sense module 60 detects that the brightness of the external environment of the vehicle is smaller than or equal to the second preset threshold value, it shows that the vehicle runs at night, and then the first ambient light sense module 40 needs to be started to detect whether the high beam of the vehicle ahead is turned on. When the third ambient light sense module 60 detects that the brightness of the external environment of the vehicle is greater than the second preset threshold value, it shows that the vehicle runs in the daytime, the high beam of the vehicle generally may not be turned on, and at the moment, the first ambient light sense module 40 does not need to be started. For example, the second preset threshold value may be 0.5 lumen to 1.5 lumens, e.g., 0.7 lumen, 1 lumen, 1.2 lumens and the like.

For example, in at least one embodiment of the present disclosure, the third ambient light sense module also may be not arranged in the anti-dazzling apparatus, but the driver manually turns on or off the first ambient light sense module 40 according to the brightness of the external environment of the vehicle.

Figure 6:
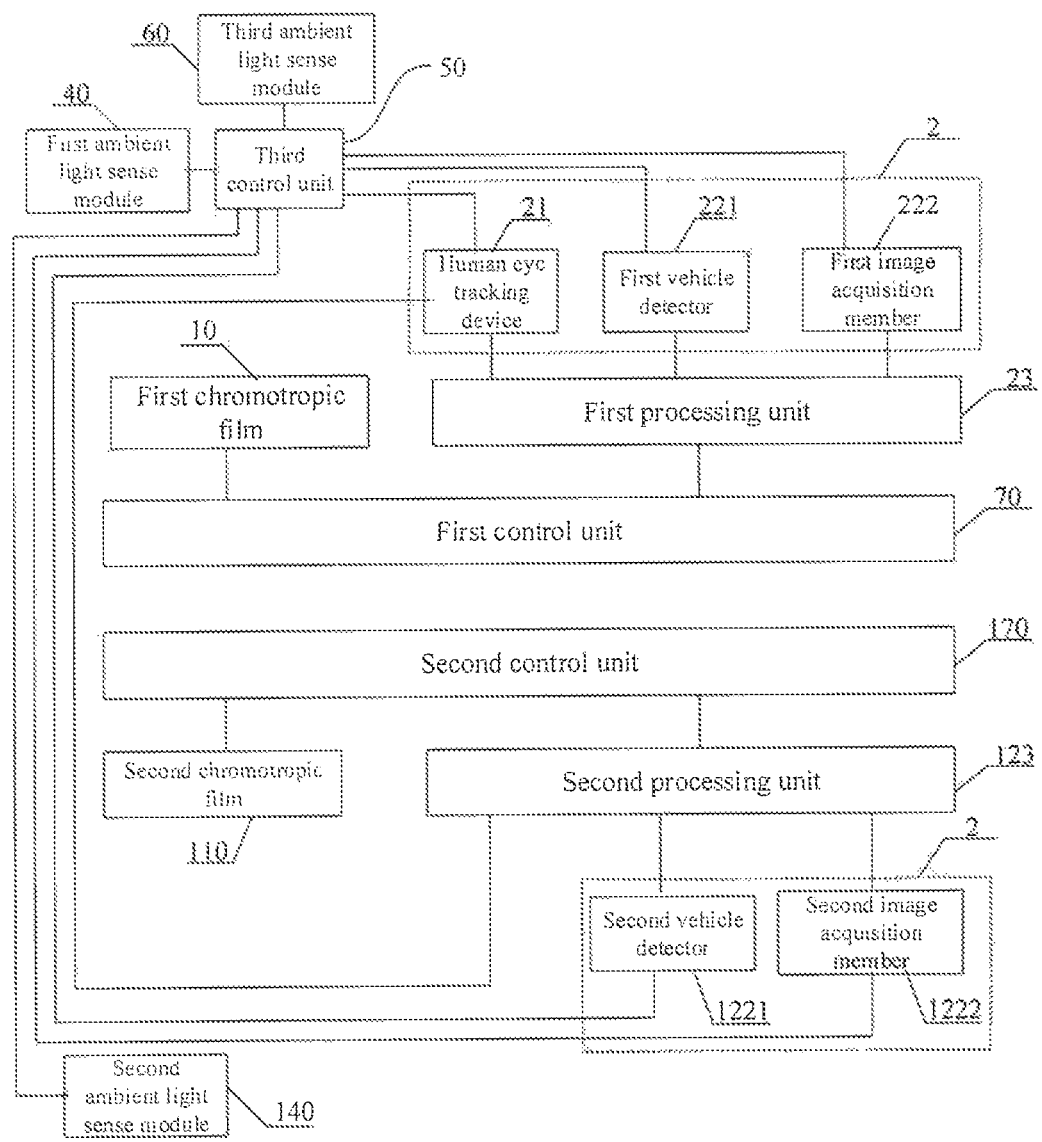
FIG. 6 is a structural schematic diagram of an anti-dazzling apparatus provided by some embodiments of the present disclosure.

FIG. 6 is a structural schematic diagram of an anti-dazzling apparatus provided by some embodiments of the present disclosure, and the anti-dazzling apparatus shown in FIG. 6 may be used for simultaneously avoiding cases that the high beam of the vehicle ahead and a high beam of a vehicle behind make the driver dazzled. For example, in at least one embodiment of the present disclosure, as shown in FIG. 6, on the basis of the above-mentioned embodiments, the chromotropic film 1 may further include a second chromotropic film 110, the processing module 3 may further include a second processing unit 123, and the control module 7 may further include a second control unit 170. The second chromotropic film 110 may be arranged on a rearview mirror, the second processing unit 123 may be used for determining a second dazzling region on the rearview mirror according to the information of the human eye and information of the high beam of the vehicle behind, the second control unit 170 is electrically connected with the second chromotropic film 110 and the second processing unit 123, respectively, and the second control unit 170 is used for controlling the second chromotropic film according to the second dazzling region so as to reduce light reflectivity of the second dazzling region.

For example, in at least one embodiment of the present disclosure, light irradiated to the second dazzling region by the high beam of the vehicle behind may be reflected to enter the human eye pupil, resulting in that the driver is dazzled. The anti-dazzling apparatus reduces the light reflectivity of the second dazzling region by determining the second dazzling region on the rearview mirror and applying a corresponding voltage to the second chromotropic film, so as to reduce the intensity of the light irradiated to the second dazzling region and reflected to enter the human eye pupil, prevent the driver from being dazzled and avoid influence of the high beam of the vehicle behind on the driver, thereby further improving safety of driving at night.

For example, in at least one embodiment of the present disclosure, the second chromotropic film may be arranged on a visible surface of the rearview mirror.

In the embodiments of the present disclosure, a mode of acquiring the information of the vehicle behind is not limited. For example, as shown in FIG. 6, the acquisition unit 2 further includes a second vehicle detector 1221 and a second image acquisition member 1222. The second vehicle detector 1221 is used for acquiring position coordinates of the vehicle behind with respect to the second vehicle detector 1221, the second image acquisition member 1222 is used for acquiring an image of the vehicle behind, and the information of the high beam of the vehicle behind may be determined according to the image of the vehicle behind and the position coordinates of the vehicle behind. Therefore, the second processing unit 123 carries out analysis processing on the information of the human eye pupil and the information of the high beam of the vehicle behind so as to determine information of the second dazzling region on the rearview mirror. Herein, the information of the high beam of the vehicle behind includes position coordinates of the high beam of the vehicle behind. The information of the second dazzling region includes position coordinates of the second dazzling region. The second control unit 170 controls the second chromotropic film 110 according to the second dazzling region, and specifically, the second control unit 170 applies a corresponding voltage to the corresponding second chromotropic film according to the position coordinates of the second dazzling region.

It should be noted that in at least one embodiment of the present disclosure, the position coordinates of the high beam of the vehicle behind may be position coordinates with respect to the second vehicle detector 1221. For example, in at least one embodiment of the present disclosure, the second vehicle detector may be a detector capable of detecting a position of the vehicle behind, such as a radar detector, an ultrasonic detector and the like, and in at least one embodiment of the present disclosure, any specific limit is not made to the second vehicle detector. For example, the second vehicle detector may be integrated with the first vehicle detector into the same vehicle detector, in other words, the position coordinates of the vehicle behind with respect to the first vehicle detector may be detected by the first vehicle detector, and the same technical effects can be achieved. For example, the second image acquisition member may be an apparatus capable of imaging, such as a camera and the like, and specifically may be selected according to actual demands.

For example, in at least one embodiment of the present disclosure, the second vehicle detector may be arranged at the top of the outside of the vehicle, and the second image acquisition member may be arranged at a position of a behind portion of the vehicle, which is close to the second vehicle detector. Specific setting positions of the second vehicle detector and the second image acquisition member are not limited herein, and mounting positions of the second vehicle detector and the second image acquisition member on the vehicle may be set according to actual demands.

For example, in at least one embodiment of the present disclosure, the second processing unit 123 may be used for carrying out analysis processing on the information of the human eye pupil and the information of the high beam of the vehicle behind so as to determine the position coordinates of the second dazzling region on the rearview mirror. For example, a working principle of the second processing unit 123 is roughly as follows: a certain determined position on the vehicle is used as a coordinate origin; and a position of the rearview mirror with respect to the vehicle is determined arid then position coordinates of the rearview mirror are also determined, and thus, the position coordinates of the rearview mirror may be pre-stored in the second processing, unit 123. Position coordinates of the human eye tracking device with respect to the coordinate origin are also determined, and similarly, position coordinates of the first vehicle detector with respect to the coordinate origin are also determined. The second processing unit 123 carries out analysis processing on the position coordinates of the human eye tracking device with respect to the coordinate origin and the position coordinates of the human eye pupil so as to acquire position coordinates of the human eye pupil with respect to the coordinate origin. The second processing unit 123 carries out analysis processing on the position coordinates of the first vehicle detector with respect to the coordinate origin, the position coordinates of the vehicle behind and the image of the vehicle behind so as to acquire position coordinates of the high beam of the vehicle behind with respect to the coordinate origin. Therefore, the position coordinates of the human eye pupil, the high beam of the vehicle behind and the rearview mirror in the same coordinate system may be determined. Herein, the human eye pupil includes the left eye pupil and the right eye pupil, the high beam of the vehicle behind include a left high beam and a right high beam of the vehicle behind, and the rearview mirrors include a left rearview mirror, a vehicle interior rearview mirror and a right rearview mirror.

Figure 7:
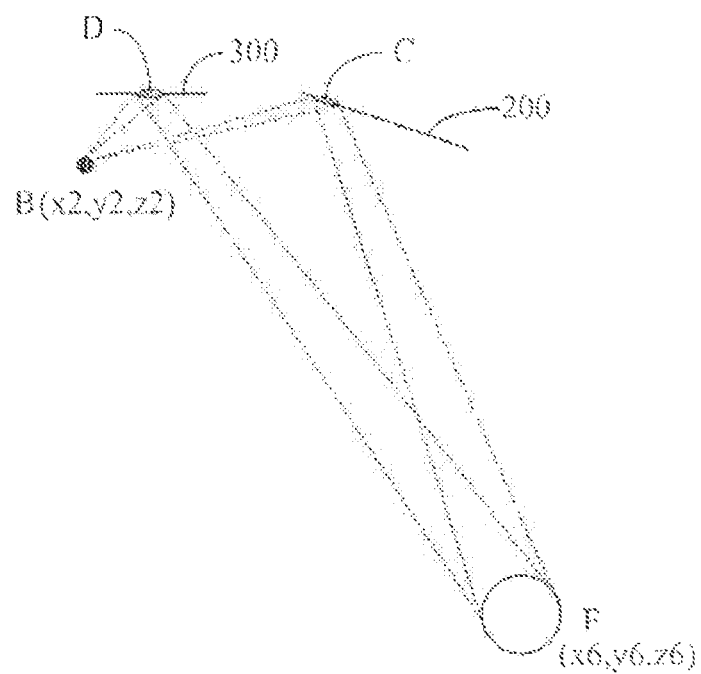
FIG. 7 is a schematic diagram of a principle of acquiring a second dazzling region, as provided by some embodiments of the present disclosure.

FIG. 7 is a schematic diagram of a principle of acquiring the second dazzling region, as provided by some embodiments of the present disclosure. For example, in order to acquire the second dazzling region, in FIG. 7, position coordinates of the right eye pupil, the right high beam of the vehicle behind, the right rearview mirror and the vehicle interior rearview mirror in the same coordinate system are shown. The position coordinates of the right eye pupil B are (x2, y2, z2), and the position coordinates of the right high beam F are (x6, y6, z6). For example, when the sight of the human eye intersects with an irradiation direction of the high beam on a reflector, light emitted by the high beam may be directly incident to the human eye by the reflector so as to make the human eye dazzled. FIG. 7 also shows a schematic diagram in which a sight of the human eye pupil B and an irradiation direction of the high beam F respectively intersect at the right rearview mirror 200 and the vehicle interior rearview mirror 300, an intersection region C is generated on the right rearview mirror 200, and an intersection region D is generated on the vehicle interior rearview mirror 300. At the moment, an optical path between the right eye pupil and the right high beam is a path from the right high beam F to the intersection region C/the intersection region D to the right eye pupil B. Then, light irradiated to the intersection region C or D by the right rearview mirror F may be reflected by the rearview mirror to enter the human eye so as to make the human eye dazzled. In other words, the intersection region C and the intersection region D are the second dazzled regions. Therefore, the second processing unit may respectively acquire position coordinates of the right high beam F in the second dazzling region C on the right rearview mirror and position coordinates of the right high beam F in the second dazzling region D on the vehicle interior rearview mirror with respect to the right eye pupil according to the position coordinates of the right eye pupil B, the right high beam F of the vehicle behind, the right rearview mirror 200 and the vehicle interior rearview mirror 300 by a light reflection principle. It should be noted that FIG. 7 merely schematically illustrates the principle of acquiring the second dazzling region, and the second dazzling region is not limited to the region shown in FIG. 7. Position coordinates of all the second dazzling regions on the left rearview mirror, the right rearview mirror and the vehicle interior rearview mirror may be acquired according to the same principle.

Figure 8:
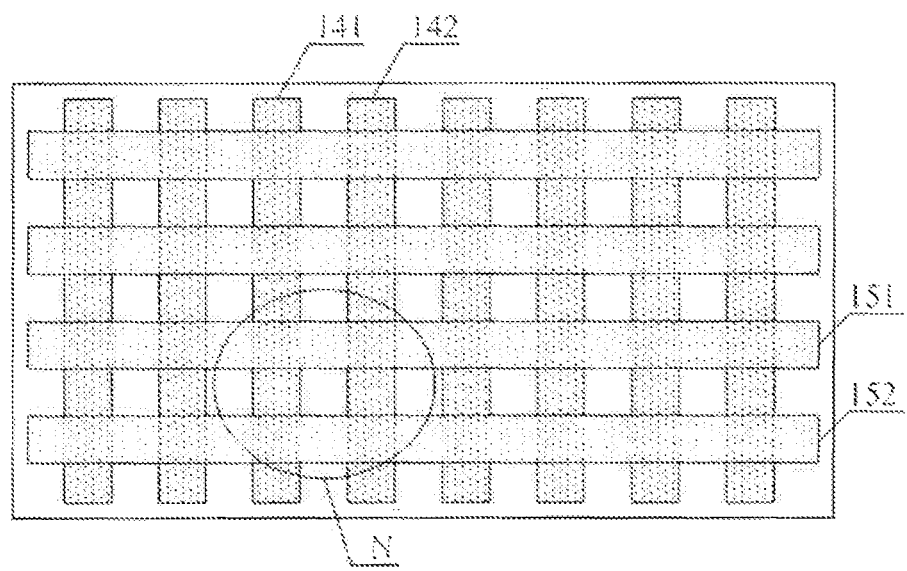
FIG. 8 is a structural schematic diagram of a rearview mirror in an anti-dazzling apparatus provided by some embodiments of the present disclosure.

FIG. 8 is a structural schematic diagram of a rearview mirror in an anti-dazzling apparatus provided by some embodiments of the present disclosure. For example, in at least one embodiment of the present disclosure, as shown in FIG. 8, the second control unit 130 may apply the corresponding voltage to the corresponding second chromotropic film according to the position coordinates of the second dazzling region, and specifically, longitudinal electrodes 141 and 142 and transverse electrodes 151 and 152 which correspond to the second dazzling region N are obtained according to the position coordinates of the second dazzling region N. Application of the corresponding voltages to the first electrode layer and the second electrode layer means that respective application of the voltages to the longitudinal electrodes 141 and 142 and the transverse electrodes 151 and 152, and the change of a voltage difference between the longitudinal electrodes 141 and 142 and the transverse electrodes 151 and 152 also means the change of a voltage difference corresponding to the second dazzling region N, so that the color of the electrochromic material at the position of the second dazzling region N is changed and for example, the color at the position of the second dazzling region N is changed into black to reduce light reflectivity of the second dazzling region N, thereby reducing the intensity of the light irradiated to the second dazzling region N and reflected to enter the human eye pupil.

For example, in at least one embodiment of the present disclosure, the anti-dazzling apparatus may further include a second ambient light sense module 140, and as shown in FIG. 6, the second ambient light sense module 140 is used for detecting brightness of ambient light behind. When the second ambient light sense module 140 detects that the brightness of the ambient light behind is greater than the first preset threshold value, the third control unit 50 is also used for starting the second vehicle detector 1221 and the second image acquisition member 1222.

For example, in at least one embodiment of the present disclosure, as shown in FIG. 6, the second ambient light sense module 140 may be used for detecting whether the high beam of the vehicle behind is turned on, and if the second ambient light sense module 140 detects that the brightness of the ambient light behind is greater than the first preset threshold value, it shows that the high beam of the vehicle behind is turned on, and then the third control unit 50 also starts the second vehicle detector 1221 and the second image acquisition member 1222 so as to timely reduce the light reflectivity of the second dazzling region on the rearview mirror and reduce the intensity of the light irradiated to the second dazzling region by the high beam of the vehicle behind and reflected to enter the human eye pupil, thereby preventing the driver from being dazzled. When the second ambient light sense module 140 detects that the brightness of the ambient light behind is not greater than the first preset threshold value, it shows that an environment behind is a street lamp environment or only a low beam of the vehicle behind is turned on, and at the moment, the second vehicle detector 1221 and the second image acquisition member 1222 do not need to be started.

For example, in at least one embodiment of the present disclosure, as shown in FIG. 6, when the third ambient light sense module 60 detects that the brightness of the ambient light is smaller than or equal to the second preset threshold value, the third control unit .50 is also used for starting the second ambient light sense module 140.

For example, in at least one embodiment of the present disclosure, as shown in FIG. 6, when the third ambient light sense module 60 detects that the brightness of the external environment of the vehicle is smaller than or equal to the second preset threshold value, it shows that the vehicle runs at night, and then the second ambient light sense module 140 needs to be started to detect whether the high beam of the vehicle behind is turned on. When the third ambient light sense module 60 detects that the brightness of the external environment of the vehicle is greater than the second preset threshold value, it shows that the vehicle runs in the daytime, the high beam of the vehicle generally may not be turned on, and at the moment, the first ambient light sense module 40 and the second ambient light sense module 140 do not need to be started.

Figure 9:
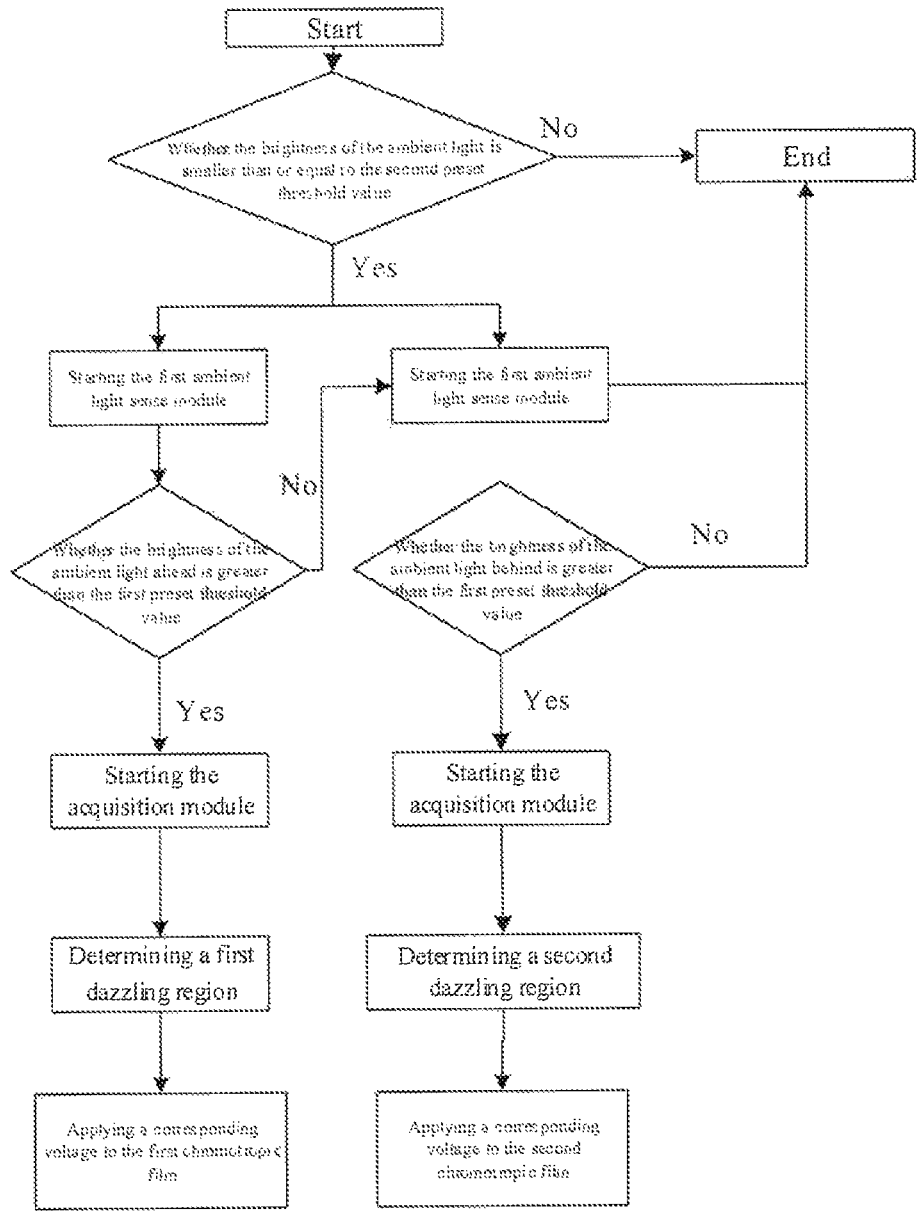
FIG. 9 is a schematic diagram of a working process of the anti-dazzling apparatus as shown in FIG. 6.

FIG. 9 is a schematic diagram of a working process of the anti-dazzling apparatus as shown in FIG. 6. For example, in connection with FIG. 9, the working process of the anti-dazzling apparatus provided by at least one embodiment of the present disclosure may be that: the third ambient light sense module detects the brightness of the ambient light and judges whether the brightness of the ambient light is smaller than or equal to the second preset threshold value, if no, the operation is ended, and if yes, the first ambient light sense module and the second ambient light sense module are started.

For example, the first ambient light sense module detects the brightness of the ambient light ahead and judges whether the brightness of the ambient light ahead is greater than the first preset threshold value, if no, the operation is ended, and if yes, the acquisition module is started; the first processing module determines the first dazzling region on the front windscreen according to the information of the human eye and the information of the high beam of the vehicle ahead; and the first control unit applies the corresponding voltage to the first chromotropic film according to the position coordinates of the first dazzling region so as to reduce the light transmittance of the first dazzling region.

For example, in the anti-dazzling apparatus of at least one embodiment of the present disclosure, the chromotropic film may further include a third chromotropic film, the processing module may further include a third processing unit, and the control module may further include a third control unit. The third chromotropic film is arranged on a rear windscreen. The third processing unit is used for determining a third dazzling region on the rear windscreen according to the information of the human eye and the information of the high beans of the vehicle behind. The third control unit is used for controlling the third chromotropic film according to the third dazzling region so as to reduce light transmittance of the third dazzling region.

Figure 10:
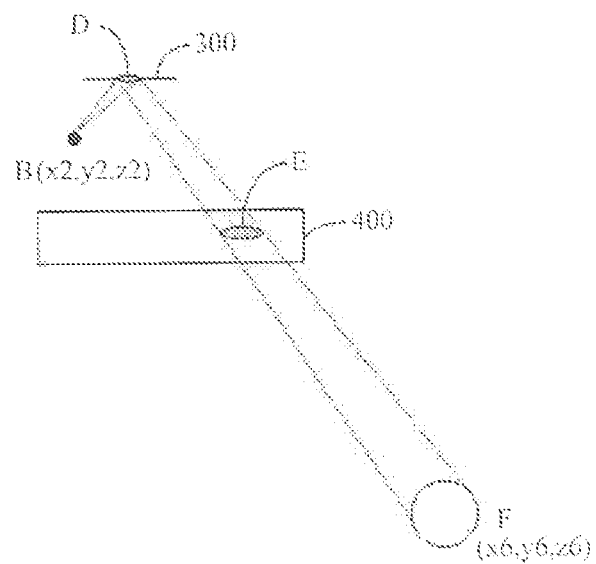
FIG. 10 is a schematic diagram of a principle of acquiring a third dazzling region, as provided by some embodiments of the present disclosure.

FIG. 10 is a schematic diagram of a principle of acquiring the third dazzling region, as provided by some embodiments of the present disclosure, For example, in at least one embodiment of the present disclosure, as shown in FIG. 10, the second dazzling region D on the vehicle interior rearview mirror is determined and a position of the rear windscreen 400 on the vehicle is determined, and thus, an intersection region of the light irradiated to the second dazzling region on the vehicle interior rearview mirror by the high beam of the vehicle behind and the rear windscreen 400 may be determined, and the intersection region is the third dazzling region F. in other words, the third processing unit determines position coordinates of the third dazzling region of the rear windscreen according to the position coordinates of the second dazzling region on the vehicle interior rearview mirror, the position coordinates of the high beam of the vehicle behind and position coordinates of the rear windscreen. The third control unit applies a corresponding voltage to the corresponding third chromotropic film according to the position coordinates of the third dazzling region to reduce the light transmittance of the third dazzling region so as to reduce the intensity of the light irradiated to the second dazzling region of the vehicle interior rearview mirror and farther reduce the intensity of the light reflected to enter the human eye pupil via the second dazzling region, thereby further improving safety of driving at night.

For example, in at least one embodiment of the present disclosure, a principle that the third control unit applies the corresponding voltage to the third chromotropic film according to the position coordinates of the third dazzling region is the same with the principle that the first control unit applies the corresponding voltage to the first chromotropic film in the above-mentioned embodiments, and is not repeated herein.

At least one embodiment of the present disclosure provides a vehicle. The vehicle may include the anti-dazzling apparatus according to any one of the embodiments above.

At least one embodiment of the present disclosure provides a control method of the anti-dazzling apparatus according to any one of the embodiments above. The control method includes: acquiring information of a human eye pupil and information of an external light source by an acquisition module; and controlling a light regulation member according to the information of the human eye pupil and the information of the external light source so as to control an intensity of light incident to a human eye. For example, in the control method of the anti-dazzling apparatus, as provided by at least one embodiment of the present disclosure, the anti-dazzling apparatus further includes a processing module and a control module. The method further includes: processing the information of the human eye pupil and the information of the external light source by utilizing the processing module so as to determine a dazzling region on the light regulation member; and controlling the light regulation member according to the dazzling region by utilizing the control module so as to reduce the intensity of the light incident to the human eye via the dazzling region.

In the method, the information of the human eye pupil and information of an external high beam are acquired; the dazzling region on the light regulation member is determined according to the information of the human eye pupil and the information of the external high beam; and the light regulation member is controlled according to the dazzling region so as to reduce the intensity of the light incident to the human eye via the dazzling region. For example, in the control method of the anti-dazzling apparatus, as provided by at least one embodiment of the present disclosure, controlling the light regulation member according to the dazzling region specifically includes: controlling a voltage of the light regulation member according to the dazzling region.

For example, in the control method of the anti-dazzling apparatus, as provided by at least one embodiment of the present disclosure, determining the dazzling region on the light regulation member according to the information of the human eye pupil and the information of the external high beam may include: determining a first dazzling region on a front windscreen according to information of the human eye and information of a high beam of a vehicle ahead; and controlling the light regulation member according to the dazzling region so as to reduce an intensity of light incident to the human eye via the dazzling region may include: controlling the first light regulation member according to the first dazzling region so as to reduce light transmittance of the first dazzling region.

For example, in the control method of the anti-dazzling apparatus, as provided by at least one embodiment of the present disclosure, before determining the first dazzling region on the front windscreen, the control method further includes: detecting brightness of ambient light ahead, and when the brightness of the ambient light ahead is greater than a first preset threshold value, starting the acquisition module.

For example, in the control method of the anti-dazzling apparatus, as provided by at least one embodiment of the present disclosure, determining the dazzling region on the light regulation member according to the information of the human eye pupil and the information of the external high beam may further include: determining a second dazzling region on a rearview mirror according to the information of the human eye and information of a high beam of a vehicle behind; and controlling the light regulation member according to the dazzling region so as to reduce the intensity of the light incident to the human eye via the dazzling region may further includes: controlling the second light regulation member according to the second dazzling region so as to reduce light reflectivity of the second dazzling region.

For example, in the control method of the anti-dazzling apparatus, as provided by at least one embodiment of the present disclosure, before determining the second dazzling region on the rearview mirror, the control method may further include: detecting brightness of ambient light behind, and when the brightness of the ambient light behind is greater than the first preset threshold value, starting the acquisition module.

For example, in the control method of the anti-dazzling apparatus, as provided by at least one embodiment of the present disclosure, determining the dazzling region on the light regulation member according to the information of the human eye pupil and the information of the external high beam may further include: determining a third dazzling region on a rear windscreen according to the information of the human eye and the information of the high beam of the vehicle behind; and controlling the light regulation member according to the dazzling region so as to reduce the intensity of the light incident to the human eye via the dazzling region may further includes: controlling the third light regulation member according to the third dazzling region so as to reduce light transmittance of the third dazzling region.

For example, in the control method of the anti-dazzling apparatus, as provided by at least one embodiment of the present disclosure, the anti-dazzling apparatus may further include a third ambient light sense module fur detecting brightness of ambient light, and the control method may further include: when the brightness of the ambient light is smaller than or equal to a second preset threshold value, starting a first ambient light sense module and/or a second ambient light sense module.

For example, in the control method of the anti-dazzling apparatus, as provided by at least one embodiment of the present disclosure, determining the dazzling region on the light regulation member includes: determining a position of the human eye pupil so as to determine a sight of the human eye pupil; determining a central position and an area of the external light source so as to determine an irradiation direction of the light emitted by the external light source; and determining the dazzling region on the light regulation member according to the sight of the human eye pupil and the irradiation direction of the light emitted by the external light source, wherein the dazzling region is a region of the light regulation member, which is positioned on a path from the light emitted by the light source to the human eye pupil. The process above may refer to related illustration in the embodiments related to FIG. 4, and is not repeated herein.

According to the anti-dazzling apparatus and the control method thereof and the vehicle which are provided by at least one embodiment of the present disclosure, by determining the dazzling region on the chromotropic film and controlling the chromotropic film according to the dazzling region, the aim of reducing the intensity of the light incident to the human eye via the dazzling region is fulfilled, influence of the external high beam of the vehicle on the driver is avoided, the driver is prevented from being dazzled, and safety of driving at night is improved.

For the present disclosure, the following statements should be noted:

(1) The accompanying drawings involve only the structure(s) in connection with the embodiment(s) of the present disclosure, and other structure(s) can be referred to common design(s).

(2) For the purpose of clarity only, in accompanying drawings for illustrating the embodiment(s) of the present disclosure, the thickness of a layer or a region may be enlarged or reduced, that is, the accompanying drawings are not drawn according to the actual scale.

(3) in case of no conflict, features in one embodiment or in different embodiments can be combined to obtain a new embodiment.

What are described above is related to the specific embodiments of the disclosure only and not limitative to the scope of the disclosure. The protection scope of the disclosure shall be based on the protection scope of the claims.

The invention claimed is:

1. An anti-dazzling apparatus, comprising:
   a light regulation member, arranged on a light path between an external light source of a vehicle and a human eye and configured to regulate an intensity of light of the external light source, which is incident to the human eye, according to information of the human eye and information of the external light source; and
   an acquisition module, configured to acquire the information of the human eye and the information of the external light source,
   wherein the anti-dazzling apparatus further comprise a third control unit, a first ambient light sense module for detecting brightness of ambient light ahead and/or a second ambient light sense module for detecting brightness of ambient light behind,
   wherein when the brightness of the ambient light ahead and/or the brightness of the ambient light behind is greater than a first preset threshold value, the third control unit is configured to start the acquisition module;
   the anti-dazzling apparatus further comprises:
   a third ambient light sense module, configured to detect brightness of ambient light,
   wherein when the brightness of the ambient light is smaller than or equal to a second preset threshold value, the third control unit is further configured to start the first ambient light sense module and the second ambient light sense module,
   wherein the first preset threshold value ranges from 0.5 lumen to 1.5 lumens.

2. The anti-dazzling apparatus according to claim 1, wherein
   the information of the human eye includes a position of a human eye pupil; and
   the information of the external light source includes a central position and an area of the external light source.

3. The anti-dazzling apparatus according to claim 1, further comprising:
   a processing module, configured to determine a dazzling region on the light regulation member according to the information of the human eye pupil and the information of the external light source; and
   a control module, configured to control the light regulation member according to the dazzling region so as to control the intensity of the light incident to the human eye via the dazzling region.

4. The anti-dazzling apparatus according to claim 3, wherein
   the light regulation member includes a plurality of light regulation subunits, and each of the plurality of light regulation subunits is set to switch between a transparent state and a dark state.

5. The anti-dazzling apparatus according to claim 4, wherein
   each of the plurality of light regulation subunits includes a liquid crystal layer and polarizers and liquid crystal control electrodes which are positioned on both opposite sides of the liquid crystal layer.

6. The anti-dazzling apparatus according to claim 3, wherein
   the light regulation member includes a chromotropic film.

7. The anti-dazzling apparatus according to claim 6, wherein
   the chromotropic film is an electrochromic film, and the control module configured to control a voltage of the chromotropic film according to the dazzling region, the electrochromic film includes a first electrode layer, a second electrode layer and an electrochromic material layer positioned between the first electrode layer and the second electrode layer.

8. The anti-dazzling apparatus according to claim 7, wherein
   the first electrode layer and/or the second electrode layer are set to include a plurality of sub-electrodes arranged in an array; or
   the first electrode layer includes a plurality of longitudinal electrodes parallel with each other, the second electrode layer includes a plurality of transverse electrodes parallel with each other, and the transverse electrodes and the longitudinal electrodes intersect.

9. The anti-dazzling apparatus according to claim 3, wherein
   the light regulation member includes a first light regulation member, and the first light regulation member is arranged on a front windscreen;
   the processing module includes a first processing unit, and the first processing unit is configured to determine a first dazzling region on the front windscreen according to the information of the human eye and information of a light source of a vehicle ahead; and
   the control module includes a first control unit, and the first control unit is configured to control the first light regulation member according to the first dazzling region so as to reduce light transmittance of the first dazzling region,
   the front windscreen includes a first glass layer and a second glass layer, and the first light regulation member is positioned between the first glass layer and the second glass layer.

10. The anti-dazzling apparatus according to claim 3, wherein
    the light regulation member includes a second light regulation member, and the second light regulation member is arranged on a rearview mirror;
    the processing module further includes a second processing unit, and the second processing unit is configured to determine a second dazzling region on the rearview mirror according to the information of the human eye and information of a light source of a vehicle behind; and
    the control module further includes a second control unit, and the second control unit is configured to control the second light regulation member according to the second dazzling region so as to reduce light reflectivity of the second dazzling region; and/or
    the light regulation member further includes a third light regulation member, and the third light regulation member is arranged on a rear windscreen;
    the processing module further includes a third processing unit, and the third processing unit is configured to determine a third dazzling region on the rear windscreen according to the information of the human eye and the information of the light source of the vehicle behind; and
    the control module further includes the third control unit, and the third control unit is configured to control the third light regulation member according to the third dazzling region so as to reduce light transmittance of the third dazzling region.

11. The anti-dazzling apparatus according to claim 1, wherein
the acquisition module includes at least one of a human eye tracking device, a vehicle detector, a first image acquisition member and/or a second image acquisition member.

12. The anti-dazzling apparatus according to claim 11, wherein
the human eye tracking device is configured to acquire an information of a human eye pupil;
the vehicle detector is configured to acquire position coordinates of a vehicle ahead and/or position coordinates of a vehicle behind;
the first image acquisition member is configured to acquire an image of the vehicle ahead; and
the second image acquisition member is configured to acquire an image of the vehicle behind.

13. A vehicle, comprising the anti-dazzling apparatus according to claim 1.

14. A control method of the anti-dazzling apparatus according to claim 1, comprising:
acquiring information of a human eye pupil and information of an external light source by an acquisition module; and
controlling the light regulation member according to the information of the human eye pupil and the information of the external light source so as to control the intensity of the light incident to a human eye.

15. The method according to claim 14, wherein the anti-dazzling apparatus further includes a processing module and a control module, the method further comprising:
processing the information of the human eye pupil and the information of the external light source by utilizing the processing module so as to determine a dazzling region on the light regulation member; and
controlling the light regulation member according to the dazzling region by utilizing the control module so as to reduce the intensity of the light incident to the human eye via the dazzling region.

16. The method according to claim 15, wherein the controlling the light regulation member according to the dazzling region includes:
controlling a voltage of the light regulation member according to the dazzling region.

17. The method according to claim 15, wherein the determining the dazzling region according to the information of the human eye pupil and the information of the external light source includes:
determining a first dazzling region on a front windscreen according to the information of the human eye and information of a light source of a vehicle ahead; and
controlling the light regulation member according to the dazzling region so as to reduce an intensity of light incident to the human eye via the dazzling region;
wherein before the determining the first dazzling region on the front windscreen, the method further comprises:
detecting brightness of ambient light ahead, and when the brightness of the ambient light ahead is greater than a first preset threshold value, starting the acquisition module.

18. The method according to claim 15, wherein determining the dazzling region according to the information of the human eye pupil and the information of the external light source includes:
determining a second dazzling region on a rearview mirror according to the information of the human eye and information of a light source of a vehicle behind; and
controlling the light regulation member according to the second dazzling region so as to reduce an intensity of light incident to the human eye via the second dazzling region; and/or
determining the dazzling region according to the information of the human eye pupil and the information of the external light source includes:
determining a third dazzling region on a rear windscreen according to the information of the human eye and information of a light source of a vehicle behind; and
controlling the light regulation member according to the third dazzling region so as to reduce an intensity of light incident to the human eye via the third dazzling region.

19. The method according to claim 15, wherein determining the dazzling region on the light regulation member includes:
determining a position of the human eye pupil so as to determine a sight of the human eye pupil;
determining a central position and an area of the external light source so as to determine an irradiation direction of the light emitted by the external light source; and
determining the dazzling region on the light regulation member according to the sight of the human eye pupil and the irradiation direction of the light emitted by the external light source,
wherein the dazzling region is a region of the light regulation member, which is positioned on a path from the light emitted by the light source to the human eye pupil.

* * * * *